US009087064B2

(12) United States Patent
Greiner

(10) Patent No.: US 9,087,064 B2
(45) Date of Patent: Jul. 21, 2015

(54) USER-DEFINED HIERARCHIES IN FILE SYSTEM DATA SETS

(75) Inventor: Mark A. Greiner, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 13/283,218

(22) Filed: Oct. 27, 2011

(65) Prior Publication Data

US 2013/0110878 A1 May 2, 2013

(51) Int. Cl.
*G06F 17/30* (2006.01)

(52) U.S. Cl.
CPC .............. *G06F 17/30091* (2013.01)

(58) Field of Classification Search
USPC .......................... 707/792, 796, 756
See application file for complete search history.

(56) References Cited

U.S. PATENT DOCUMENTS

| 5,701,137 | A | | 12/1997 | Kiernan et al. | |
| 5,917,492 | A | | 6/1999 | Bereiter et al. | |
| 6,016,497 | A | * | 1/2000 | Suver | 1/1 |
| 6,487,708 | B1 | * | 11/2002 | Canaris | 716/121 |
| 6,530,072 | B1 | * | 3/2003 | Hagerman et al. | 716/103 |
| 6,701,333 | B2 | | 3/2004 | Suermondt et al. | |
| 6,769,095 | B1 | * | 7/2004 | Brassard et al. | 715/234 |
| 6,853,997 | B2 | * | 2/2005 | Wotring et al. | 707/756 |
| 7,444,350 | B1 | * | 10/2008 | MacKinnon et al. | 1/1 |
| 7,672,955 | B2 | | 3/2010 | White | |
| 8,117,217 | B2 | * | 2/2012 | Ishizaki et al. | 707/756 |
| 2002/0184250 | A1 | * | 12/2002 | Kern et al. | 707/204 |
| 2003/0115188 | A1 | * | 6/2003 | Srinivasa et al. | 707/3 |
| 2004/0237090 | A1 | * | 11/2004 | Pfeifer | 719/310 |
| 2005/0033763 | A1 | | 2/2005 | Chen et al. | |
| 2005/0091667 | A1 | | 4/2005 | McKee et al. | |
| 2005/0234906 | A1 | * | 10/2005 | Ganti et al. | 707/5 |
| 2006/0036568 | A1 | * | 2/2006 | Moore et al. | 707/1 |
| 2006/0093222 | A1 | * | 5/2006 | Saffer et al. | 382/224 |
| 2006/0106783 | A1 | * | 5/2006 | Saffer et al. | 707/3 |
| 2006/0156314 | A1 | * | 7/2006 | Waldorf | 719/328 |
| 2006/0206866 | A1 | * | 9/2006 | Eldrige et al. | 717/122 |
| 2008/0154866 | A1 | | 6/2008 | Beyer et al. | |
| 2009/0106743 | A1 | * | 4/2009 | Parisien | 717/136 |
| 2009/0287994 | A1 | * | 11/2009 | Ichino | 715/234 |
| 2010/0125794 | A1 | | 5/2010 | Hampton et al. | |
| 2011/0225385 | A1 | * | 9/2011 | Tofano | 711/170 |
| 2012/0130983 | A1 | * | 5/2012 | Ryan et al. | 707/715 |
| 2013/0086066 | A1 | * | 4/2013 | Anderson et al. | 707/737 |

OTHER PUBLICATIONS

Neuman, B. Clifford, "The Prospero File System: A Global File System Based on the Virtual System Model," Information Sciences Institute, University of Southern California, May 1992, pp. 1-16.
"z/OS Basic Skills Information Center: z/OS Concepts," IBM Corporation, 2006, 2010, pp. 1-120.
"z/Architecture Principles of Operation," IBM Publication No. SA22-7832-08, Ninth Edition, Aug. 2010.

* cited by examiner

*Primary Examiner* — Sherief Badawi
*Assistant Examiner* — Christopher J Raab
(74) *Attorney, Agent, or Firm* — Steven Chiu, Esq.; Blanche E. Schiller, Esq.; Heslin Rothenberg Farley & Mesiti P.C.

(57) ABSTRACT

Hierarchical levels of data sets are defined. An object is provided, and the object includes a user-defined delimiter used to indicate a desired level of hierarchy for data sets. A set of rules associated with the object is used to present data sets. The object and the set of rules are employed to determine one or more data sets to be presented to a user. The presenting is based on the object and the set of rules, and the presenting presents the one or more data sets in a hierarchy defined by at least the object.

20 Claims, 7 Drawing Sheets

USER-DEFINED HIERARCHIES IN FILE SYSTEM DATA SETS

BACKGROUND

One aspect of this invention relates, in general, to data sets used in computing environments, and in particular, to representations of such data sets.

Typically, the manner in which a data set is represented is forced on the user. A data set is a flat file, but a hierarchy may be imposed on the data set. There are different types of data sets, including sequential (a.k.a., non-partitioned) and partitioned data sets. A sequential data set is considered one file, and a partitioned data set is viewed as a collection of sequential data files (called members) plus a directory.

A partitioned data set has at least two levels of hierarchy and a sequential data set has one or more levels of hierarchy. As an example, for data sets employed by the z/OS® operating system, offered by International Business Machines Corporation, the name of a sequential data set may include periods and each period is a delimiter for a hierarchical level. As an example, HLQ.AAA.BBB is the name of a sequential data set, which has three levels, as indicated by the two periods.

Since, in this case, a hierarchy is imposed by the periods, different types of data sets may resolve to the same structure. For instance, a sequential data set HLQ.AAA.BBB resolves to the same structure as partitioned data set member HLQ.AAA(BBB), e.g., hlq/aaa/bbb.

BRIEF SUMMARY

The shortcomings of the prior art are overcome and additional advantages are provided through the provision of a computer program product for facilitating defining of hierarchical levels of data sets. The computer program product comprises a storage medium readable by a processing circuit and storing instructions for execution by the processing circuit for performing a method. The method includes, for instance, obtaining, by a processor, an object, the object comprising a user-defined delimiter used to indicate a desired level of hierarchy for data sets; obtaining, by the processor, a set of rules associated with the object to be used to present data sets; employing, by the processor, the object and the set of rules to determine one or more data sets to be presented to a user; and presenting, by the processor, the one or more data sets, wherein the presenting is based on the object and the set of rules, and wherein the presenting presents the one or more data sets in a hierarchy defined by at least the object.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with an aspect of the present invention, a capability is provided to enable users to define a desired level of hierarchy for data sets. This desired level of hierarchy is used, for instance, in representing data sets to the user. A user chooses and specifies the extent of a hierarchy to present data sets (e.g., z/OS® data sets) in a migration (e.g., non-z/OS®) environment or an application. With this capability, mandatory replacement of periods with slashes in data set names, such as z/OS® names (and the additional levels of hierarchy implied), are discarded. Instead, a user-defined delimiter is used to specify a desired level of hierarchy.

Figure 1:
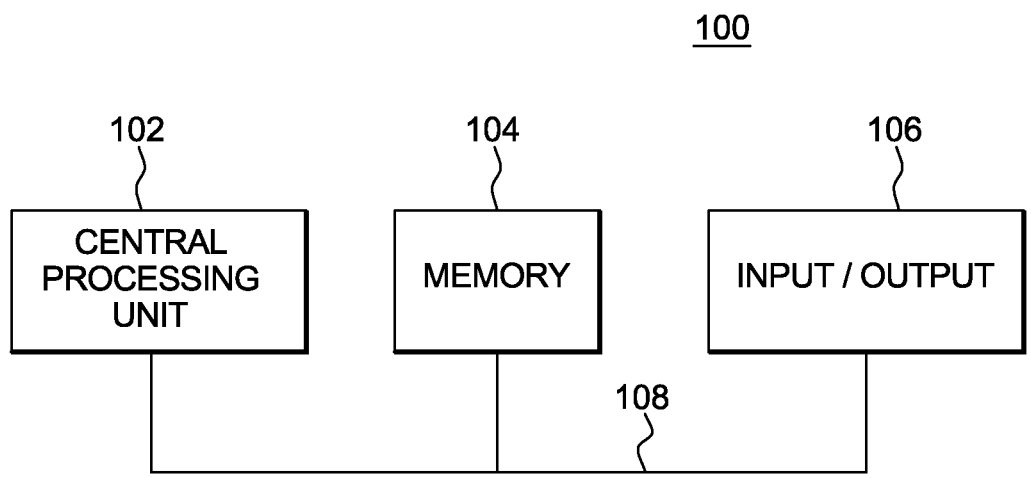
FIG. 1 depicts one example of a computing environment to incorporate and use one or more aspects of the present invention.

One embodiment of a computing environment to incorporate and use one or more aspects of the present invention is described with reference to FIG. 1. In this example, computing environment 100 includes, for instance, one or more processors 102 (e.g., central processing units (CPUs)), a memory 104 (e.g., a main memory), and one or more input/output (I/O) devices or interfaces 106 coupled to one another via, for example, one or more buses 108. As examples, processor 102 is an RS/6000® or a System z® server offered by International Business Machines Corporation, Armonk, N.Y., or an x86 processor offered by Intel Corporation, Santa Clara, Calif. System z® is based on the z/Architecture® offered by International Business Machines Corporation. Aspects of the z/Architecture® are described in "z/Architecture Principles of Operation," IBM Publication No. SA22-7832-08, Ninth Edition, August 2010, which is hereby incorporated herein by reference in its entirety.

z/Architecture®, RS/6000®, System z® and z/OS® are registered trademarks of International Business Machines Corporation, Armonk, N.Y. Other names used herein may be registered trademarks, trademarks or product names of International Business Machines Corporation or other companies.

Processor 102 executes an operating system, such as the Windows operating system, offered by Microsoft Corporation, or the Linux operating system. Such operating systems include folders, e.g., Windows Explorer folders, or directories, e.g., Linux directories, that may benefit from one or more aspects of the present invention. However, one or more aspects of the present invention may also be used with other systems, directories and/or folders.

In one example, the operating system (e.g., the file system) accesses shared data that is to be presented to a user or user's application. This shared data may be in a format of a different operating system than the operating system accessing the data. For instance, the operating system accessing the data may be Windows or Linux, and the shared data may be in a z/OS® format. Thus, in this example, the data, when presented to the user, is in a hierarchical representation forced by the z/OS® rules associated with the z/OS® data sets. Information relating to z/OS® data sets is described in a publication entitled "z/OS Basic Skills Information Center, z/OS Concepts," 2010, available at International Business Machines Corporation, and hereby incorporated herein by reference in its entirety. This hierarchical representation, however, may not be acceptable or desired by the user.

Figure 2:
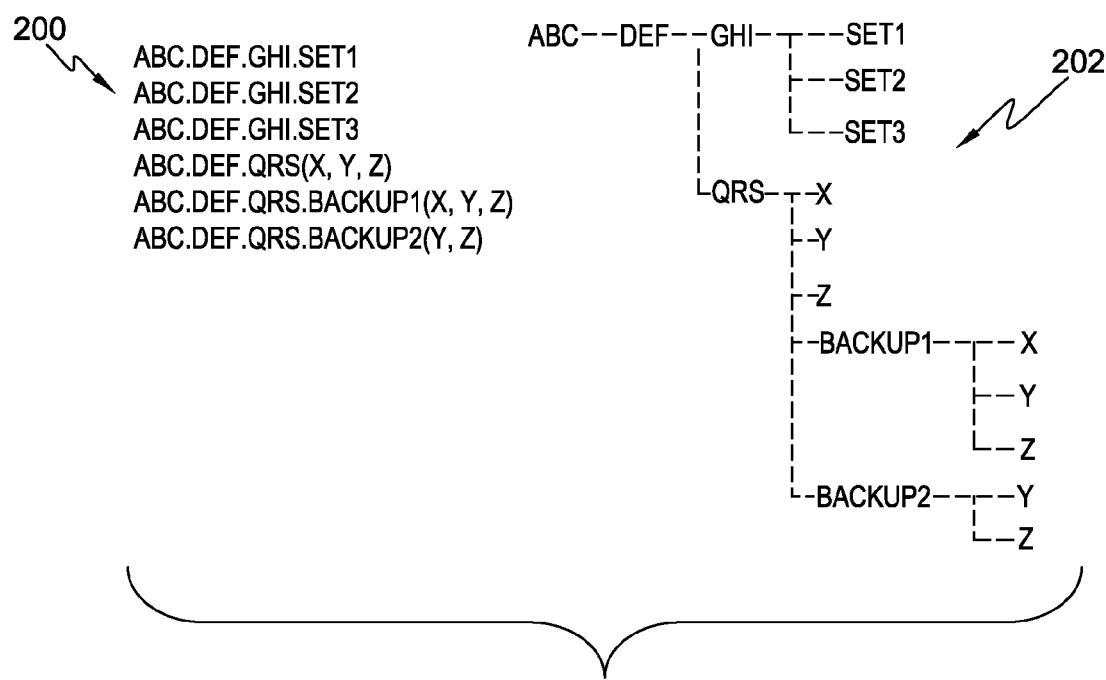
FIG. 2 depicts one example of a forced hierarchical representation of data sets.

To further explain, prior to one or more aspects of the present invention, a data set, such as a z/OS® named data set, had a forced hierarchical representation or mapping, an example of which is described with reference to FIG. 2. Depicted in FIG. 2 is one example of a typical mapping of z/OS® named data sets 200 (files listed on the left side of the figure) to a hierarchy-based naming 202 (graph on the right side of the figure). The left part of the graph represents the higher levels of the hierarchy, while the right part of the graph represents the lower levels of the hierarchy.

In a typical mapping, the periods in data set names are replaced by slashes in file names when data set names are presented to the user (e.g., by the operating system, file system or application), and each slash in the resulting file name will mark a different level in the (forced) hierarchy. Directories are named by the characters that were punctuated between the periods in the data set name (now slashes in the file name). The first portion of a data set name (the characters to the left of the first period) form a directory name at the highest hierarchy level. For data set names with more than one period, the second portion of the data set name (the characters between the first and second period) designate a directory name at the second level. This process continues until reading the last (right-most) period, although this last hierarchy level is designated differently by partitioned data sets versus non-partitioned data sets. For non-partitioned data sets, the last portion of the data set (the characters to the right of the last period) form file names in the lowest hierarchy level. For partitioned data sets, member names (in parentheses) of the partitioned data sets become file names in the lowest hierarchy level.

Prior schemes force a particular presentation to be employed (at additional hierarchy levels) which may not be suited to the user's needs. Further, previous mechanisms may also lead to collisions when representing certain collections of data set names (e.g., partitioned data set names and sequential data set names) in that both resolve to identical structures within the present art.

Thus, in accordance with an aspect of the present invention, a capability is provided that discards the mandatory replacement of periods in the data set names, and therefore, the additional levels of implied hierarchy, by allowing the user to define the desired level of hierarchy. The user provides a user-defined delimiter (e.g., ZFF in one particular example) that is used to define the hierarchy, as described below. Further, certain rules are followed. In one example, these rules are for z/OS® data sets; however, in other examples, the rules or similar rules apply to other data sets. These rules include the following, in one embodiment:

(i) Periods in the data set names are retained; that is, they are not automatically translated to slashes.

(ii) The presence of an object named <given string of characters>.ZFF; that is, an object whose name is suffixed with "ZFF", defines, e.g., a z/OS® File-system Folder (zFF).

Figure 3:
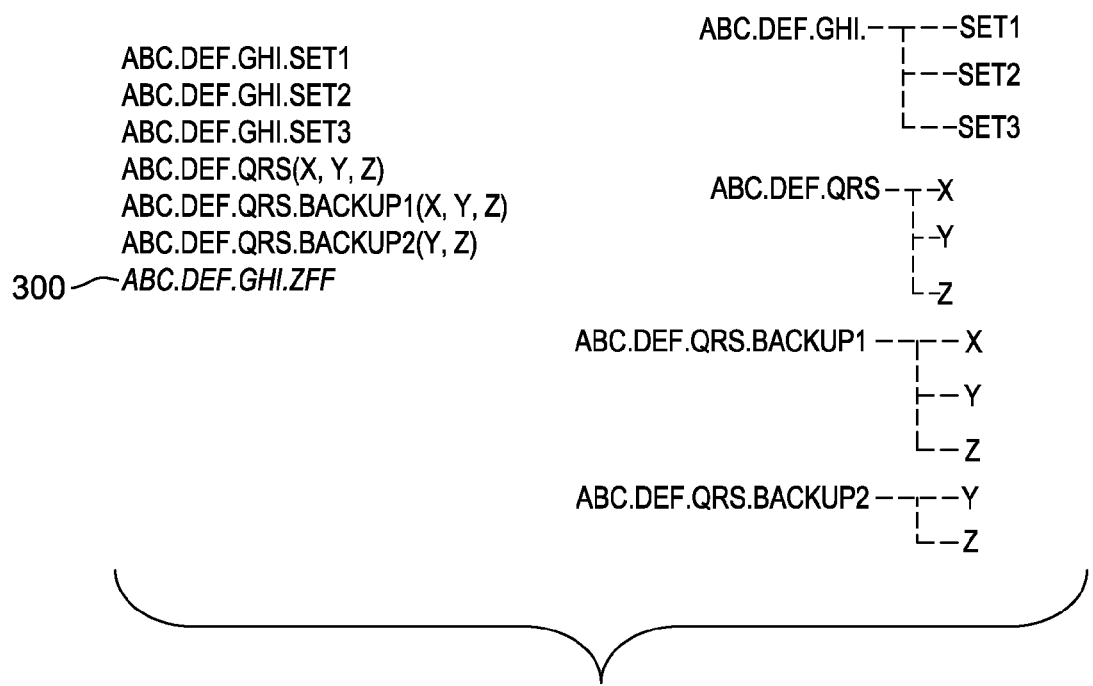
FIG. 3 depicts one example of a hierarchical representation of data sets, in accordance with an aspect of the present invention.

(iii) A zFF may be represented by an internal construct, such as a browser cookie, or it may be realized by a non-partitioned z/OS® data set. As an example, consider FIG. 3 with data set ABC.DEF.GHI.ZFF 300: the data set is presented as ABC.DEF.GHI. (note trailing period) and acts as a z/OS® File-system (virtual) Folder.

(iv) If a zFF named <given string of characters>.ZFF exists, then data sets having names in the form of <given string of character>.<any match> are considered to be descendants of the zFF. In the example given by FIG. 3, where data sets ABC.DEF.GHI.SET1, ABC.DEF.GHI.SET2, ABC.DEF.GHI.SET 3, and ABC.DEF.GHI.ZFF exist, then data sets ABC.DEF.GHI.SET1, ABC.DEF.GHI.SET2, and ABC.DEF.GHI.SET3 are considered to be descendants of virtual folder ABC.DEF.GHI. Thus, if there is a request for data sets that match ABC.DEF.GHI.ZFF, then ABC.DEF.GHI.SET1, ABC.DEF.GHI.SET2 and ABC.DEF.GHI.SET3 are presented. They are presented in a hierarchy, as depicted in, e.g., FIG. 3.

(v) A partitioned data set retains its mapping, as before, relative to its directory and its members. In the example given by FIG. 3, data set ABC.DEF.QRS is a partitioned data set, and the normal mapping of data set members (X, Y, and Z) as children of folder ABC.DEF.QRS is unchanged. Internally, a partitioned data set is divided (partitioned) into its directory and its members. Because of this internal structure, a partitioned data set can be considered as having at least two hierarchy levels with its directory serving as the higher level relative to the rest of the hierarchy, and its members existing at the lower level of the hierarchy. In this example, there are two hierarchy levels: ABC.DEF.QRS and X, in one example; or ABC.DEF.QRS and Y; or ABC.DEF.QRS and Z, in other examples.

Figure 4:
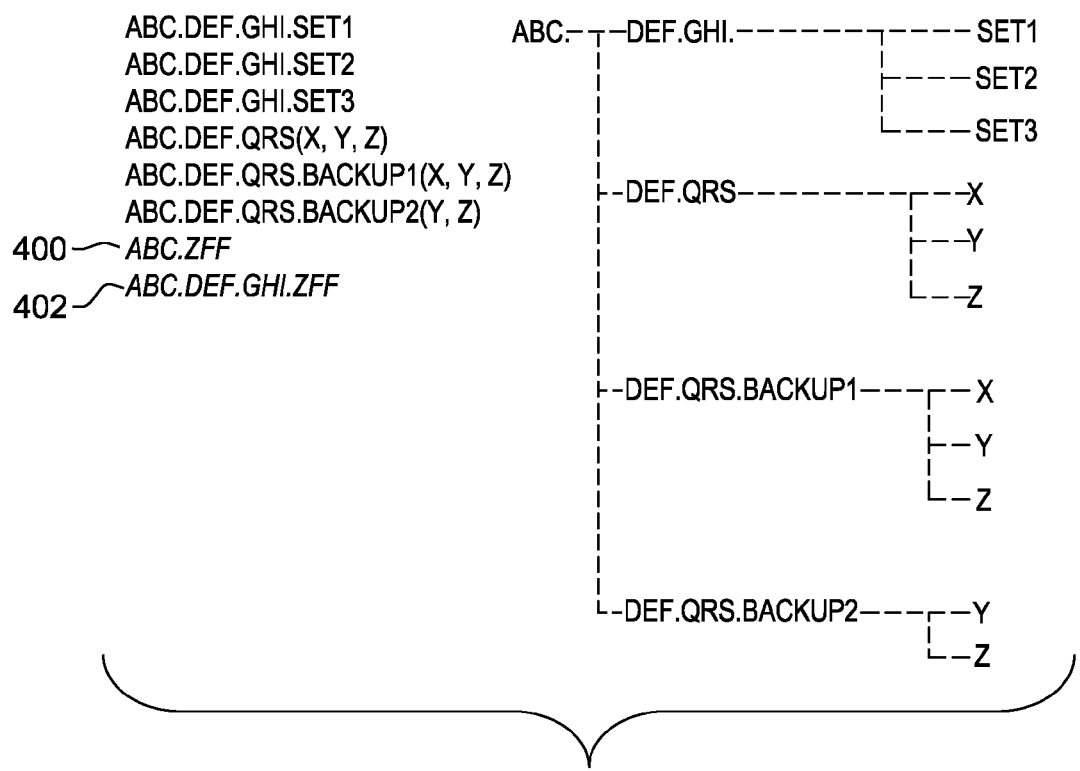
FIG. 4 depicts another example of a hierarchical representation of data sets, in accordance with an aspect of the present invention.

(vi) zFF objects may exist at different levels in the hierarchy. FIG. 4 gives an example where ABC.ZFF 400 and ABC.DEF.GHI.ZFF 402 both exists as zFFs and partitioned data set ABC.DEF.QRS also exists.

Figure 5:
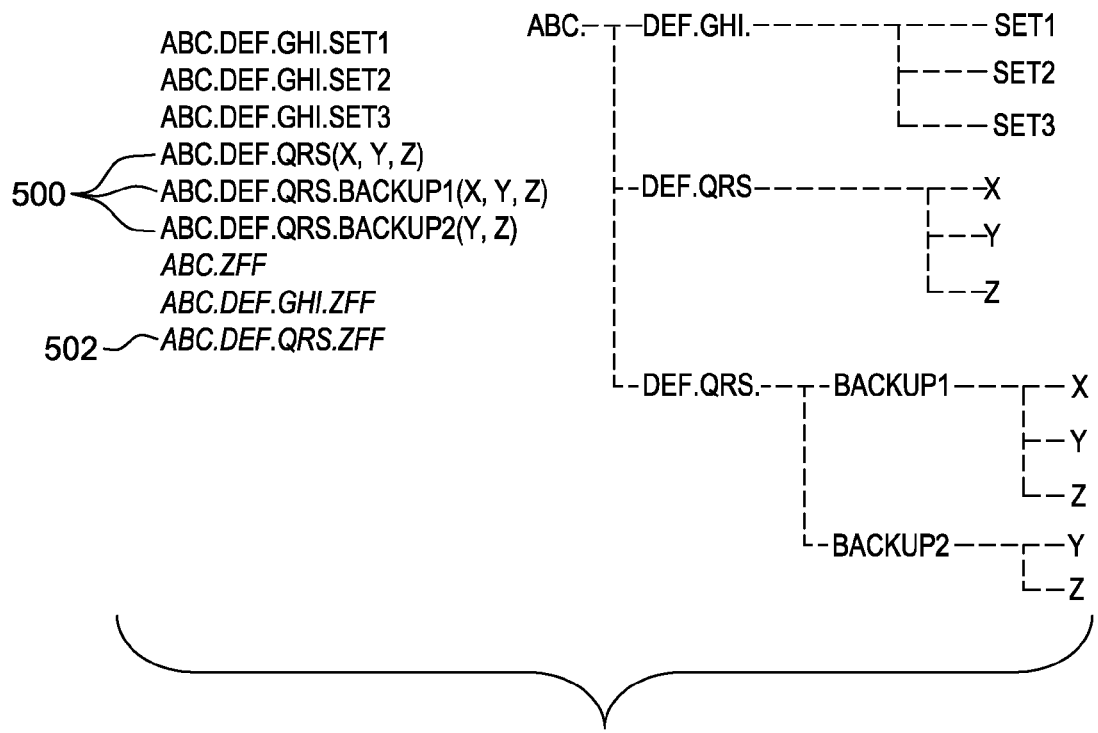
FIG. 5 depicts yet another example of a hierarchical representation of data sets, in accordance with an aspect of the present invention.

(vii) The existence of a zFF object named <given string of characters>.ZFF does not preclude the existence of a data set named <given string of characters>, and vice versa. FIG. 5 gives an example where both data sets ABC.DEF.QRS 500 and ABC.DEF.QRS.ZFF 502 exist. In this case, the former data set is preset as ABC.DEF.QRS (with no trailing period). (Although this example shows ABC.DEF.QRS as a partitioned data set, the general case may exist as a sequential or partitioned data set.) The latter data set (zFF) is presented as ABC.DEF.QRS. (note trailing period), and acts as a virtual folder where (partitioned) data sets ABC.DEF.QRS.BACKUP1 and ABC.DEF.QRS.BACKUP2 are reckoned as descendants.

(viii) Under user control, a zFF object of form <high-level qualifier>.ZFF may be assumed for all high-level qualifiers in the system. A high-level qualifier is generally the first part of a z/OS® data set name; that is, the characters to the left of the first period in the name. As an example, if this control is enabled, then the z/OS® files represented in FIG. 3 would map to the hierarchy representation in FIG. 4; that is, ABC.ZFF is assumed to exist when this control is enabled.

Figure 6A:
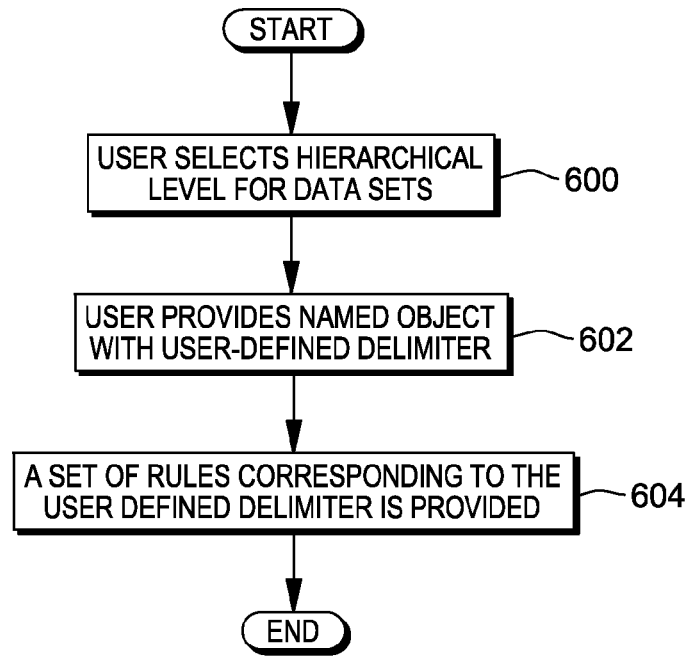
FIG. 6A depicts one example of the logic used to provide a user-defined delimiter and associated rules, in accordance with an aspect of the present invention.

One embodiment of the logic associated with providing a user-defined delimiter to manage the level of hierarchies in a data set is described with reference to FIGS. 6A-6B. FIG. 6A depicts one embodiment of the logic to provide a user-defined delimiter and associated rules; and FIG. 6B depicts one embodiment of the logic to use the delimiter to present data sets, in accordance with an aspect of the present invention.

Referring to FIG. 6A, initially, a user selects a hierarchical level for data sets to be presented to the user, STEP 600. To indicate this desired level of hierarchy, the user provides one or more named objects with a user-defined delimiter, STEP 602. For example, the user may determine that a suitable delimiter is the suffix .ZFF. Thus, the user creates one or more named objects and places .ZFF in a particular location in each named object to indicate a particular hierarchy. For instance, in the named object ABC.DEF.ZFF, the first level of hierarchy is ABC.DEF and the next level of hierarchy includes that portion of the data set name after the DEF. As a further example, in the named object ABC.ZFF, ABC is the first level of hierarchy, and the next level is after ABC. The named objects are stored, e.g., on storage devices, such as Direct Access Storage Devices (DASD) or in memory.

A set of rules corresponding to the user-defined delimiter is provided and stored in memory or in storage, STEP 604. In one example, the set of rules is previously determined and stored, and corresponds to the type of data sets (e.g., z/OS®) and the user-defined delimiter (e.g., ZFF). The user-defined delimiter, ZFF, is provided to a user for use or the user may select a different delimiter and the rules may be changed to reflect that other delimiter. Other examples also exist. One example of a set of rules for the ZFF delimiter and z/OS® data sets is described above.

Figure 6B:
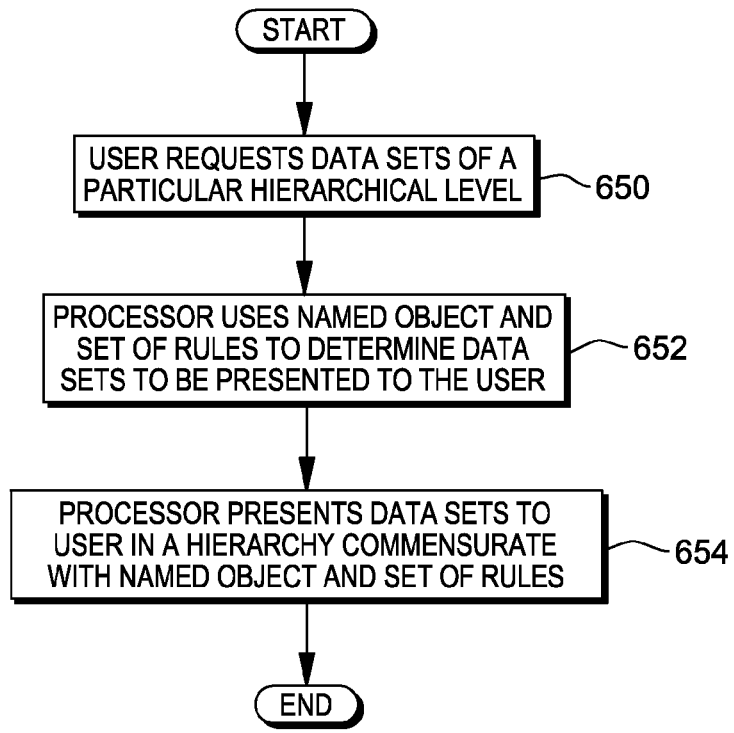
FIG. 6B depicts one example of the logic used to employ the user-defined level of hierarchy to present data sets to a user, in accordance with an aspect of the present invention.

Referring to FIG. 6B, after initializing the system to be able to use user-defined delimiters, a user may request data sets of a particular hierarchical level, STEP 650. The request may be made by a user employing the Windows or Linux operating system and the requested data sets may be z/OS® data sets, in one example. This request is handled by a processor (e.g., the operating system, such as the file system) that receives the request. The processor uses the named object and the set of rules (obtained from DASD or memory, as examples) to determine data sets to be presented to the user, STEP 652. For example, if the named object is ABC.DEF.ZFF, then the processor searches for data set names beginning with ABC.DEF and having any other string of characters thereafter. The processor presents these data sets to the user in a hierarchy commensurate with the named object and the set of rules, STEP 654. Examples of such presentations are described above with reference to FIGS. 3-5.

As described above, a user-defined object is provided that defines a hierarchy used to present data sets (e.g., ABC.DEF.GHI.ZFF, where ZFF, in this example, is the user-defined object). If the user-defined object named <given string of characters >.<user-defined object name> exists, then data sets having names in the form of <given string of characters>.<any match> are considered to be descendents of the user-defined object (e.g., if data sets ABC.DEF.GHI.SET1, ABC.DEF.GHI.SET2, ABC.DEF.GHI.SET3, and ABC.DEF.GHI.ZFF exist, then data sets ABC.DEF.GHI.SET1, ABC.DEF.GHI.SET2, and ABC.DEF.GHI.SET3 are considered to be descendents of virtual folder ABC.DEF.GHI.). Thus, responsive to a request for data sets and given the named object ABC.DEF.GHI.ZFF, data sets ABC.DEF.GHI.SET1, ABC.DEF.GHI.SET2 and ABC.DEF.GHI.SET3 are presented to the user. The manner in which they are displayed is consistent within the hierarchical levels defined by ABC.DEF.GHI.ZFF.

Further, partitioned data sets retain a normal mapping as before and the user-defined objects may exist at different levels in the hierarchy. The existence of a user-defined object named <given string of characters>.<user-defined object name> does not preclude the existence of a data set named <given string of characters>, and vice versa. Under user control, a user-defined object of form <high-level qualifier>.<user-defined object> may be assumed for all high-level qualifiers in the system. A high-level qualifier is generally the first part of a data set name (e.g., the characters to the left of the first period in a z/OS® data set name).

The data set names that are presented herein may be used by users and/or user applications. In one example, they may be used in line commands, in that the name is copied to the command and used therein. As a further example, the names can be displayed/used at their relative hierarchies. Other uses are also possible.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware one or more aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
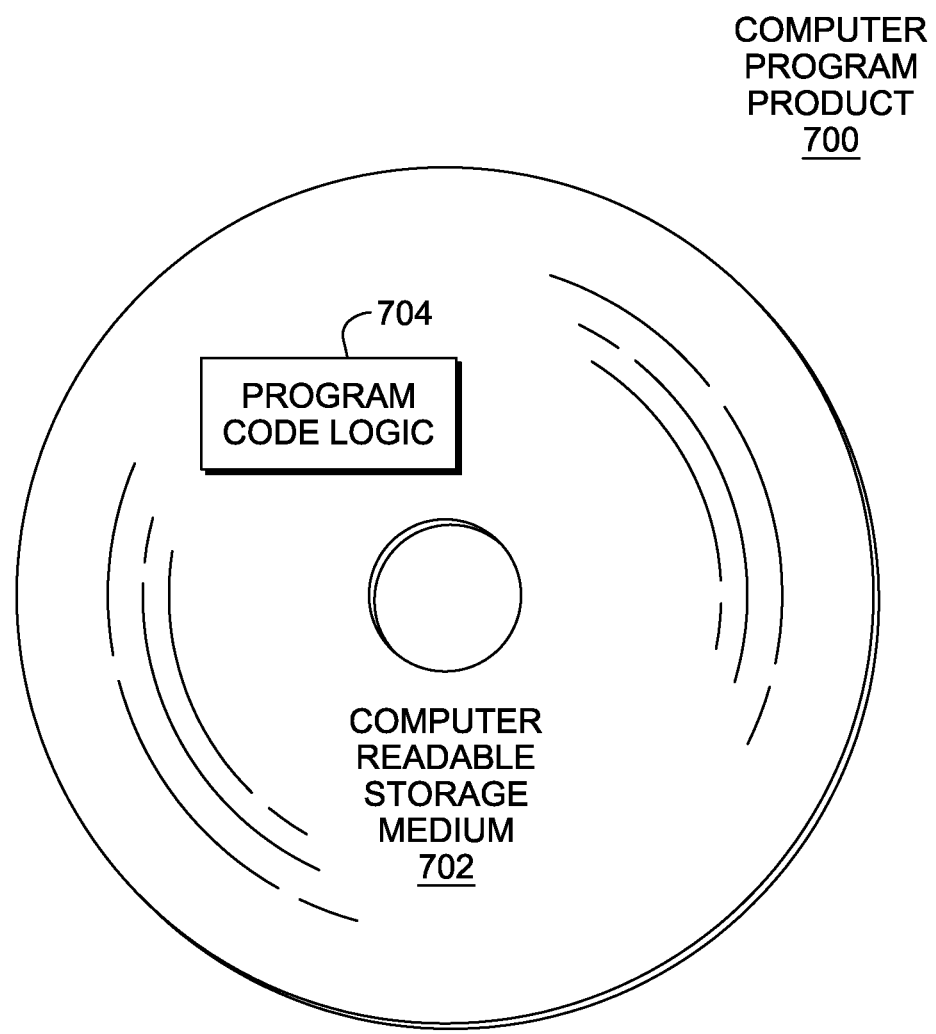
FIG. 7 depicts one embodiment of a computer program product incorporating one or more aspects of the present invention.

Referring now to FIG. 7, in one example, a computer program product 700 includes, for instance, one or more non-transitory computer readable storage media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For instance, the computing environment can be based on architectures other than Intel® or the z/Architecture®. Further, the data sets may be other than z/OS® data sets, and the delimiter may be other than ZFF. Further, operating systems other than Windows and Linux may benefit from one or more aspects of the present invention. Additionally, hierarchical levels may be presented differently than described herein. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating defining of hierarchical levels of data sets, said computer program product comprising:

a non-transitory computer readable storage medium readable by a processing circuit and storing instructions for execution by the processing circuit for performing a method comprising:

obtaining, by a processor from a storage device or memory, an object stored in the storage device or memory, the object comprising a user-defined delimiter explicitly stored in the object and used to indicate for a user a desired level of hierarchy for data sets, the data sets being defined based on rules of a particular operating system and having a forced hierarchical representation based on the rules of the particular operating system and the user-defined delimiter to be used to provide the desired level of hierarchy for the user, the desired level of hierarchy being different from the forced hierarchical representation, and the user-defined delimiter being placed in a particular user selected location in the object to indicate the desired level of hierarchy for data sets, the data sets being separate from the object and one or more data sets of the data sets to be presented in a manner based on the object, including the user-defined delimiter;

obtaining, by the processor, a set of rules associated with the object to be used to present data sets, the set of rules specific to the user-defined delimiter;

employing, by the processor, the object and the set of rules to determine one or more data sets to be presented to the user; and presenting, by the processor, the one or more data sets, wherein the presenting is based on the object, including placement of the user-defined delimiter in the object, and the set of rules, and wherein the presenting presents the one or more data sets in a hierarchy defined by at least the object.

2. The computer program product of claim 1, wherein the hierarchy is defined by placement of the user-defined delimiter in the object.

3. The computer program product of claim 1, wherein there is another object comprising the user-defined delimiter, and wherein the user-defined delimiter is placed in the object at one location to define a first hierarchy and placed in the another object in another location to define a second hierarchy.

4. The computer program product of claim 1, wherein the one or more data sets include at least one or more sequential data sets or one or more partitioned data sets.

5. The computer program product of claim 1, wherein the set of rules comprises a rule that retains one or more periods in a data set in that the one or more periods are not automatically translated to one or more slashes.

6. The computer program product of claim 1, wherein the user-defined delimiter defines a file system folder for a particular operating system for which the user-defined delimiter is associated.

7. The computer program product of claim 1, wherein existence of <given string of characters>.user-defined delimiter indicates that data sets with <given string of characters>/<any match> are considered descendants of the user-defined delimiter.

8. The computer program product of claim 1, wherein the set of rules comprises a rule indicating that a partitioned data set is mapped in a manner irrespective of the user-defined delimiter.

9. A computer system for facilitating defining of hierarchical levels of data sets, said computer system comprising:

a memory; and a processor in communications with the memory, wherein the computer system is configured to perform a method, said method comprising:

obtaining, by a processor from a storage device or memory, an object stored in the storage device or memory, the object comprising a user-defined delimiter explicitly stored in the object and used to indicate for a user a desired level of hierarchy for data sets, the data sets being defined based on rules of a particular operating system and having a forced hierarchical representation based on the rules of the particular operating system and the user-defined delimiter to be used to provide the desired level of hierarchy for the user, the desired level of hierarchy being different from the forced hierarchical representation, and the user-defined delimiter being placed in a particular user selected location in the object to indicate the desired level of hierarchy for data sets, the data sets being separate from the object and one or more data sets of the data sets to be presented in a manner based on the object, including the user-defined delimiter;

obtaining, by the processor, a set of rules associated with the object to be used to present data sets, the set of rules specific to the user-defined delimiter;

employing, by the processor, the object and the set of rules to determine one or more data sets to be presented to the user; and presenting, by the processor, the one or more data sets, wherein the presenting is based on the object, including placement of the user-defined delimiter in the object, and the set of rules, and wherein the presenting presents the one or more data sets in a hierarchy defined by at least the object.

10. The computer system of claim 9, wherein the hierarchy is defined by placement of the user-defined delimiter in the object.

11. The computer system of claim 9, wherein there is another object comprising the user-defined delimiter, and wherein the user-defined delimiter is placed in the object at one location to define a first hierarchy and placed in the another object in another location to define a second hierarchy.

12. The computer system of claim 9, wherein the one or more data sets include at least one or more sequential data sets or one or more partitioned data sets.

13. The computer system of claim 9, wherein the set of rules comprises a rule that retains one or more periods in a data set in that the one or more periods are not automatically translated to one or more slashes.

14. The computer system of claim 9, wherein the user-defined delimiter defines a file system folder for a particular operating system for which the user-defined delimiter is associated.

15. The computer system of claim 9, wherein existence of <given string of characters>.user-defined delimiter indicates that data sets with <given string of characters>/<any match> are considered descendants of the user-defined delimiter.

16. The computer system of claim 9, wherein the set of rules comprises a rule indicating that a partitioned data set is mapped in a manner irrespective of the user-defined delimiter.

17. A method of facilitating defining of hierarchical levels of data sets, said method comprising:

obtaining, by a processor from a storage device or memory, an object stored in the storage device or memory, the object comprising a user-defined delimiter explicitly stored in the object and used to indicate for a user a desired level of hierarchy for data sets, the data sets being defined based on rules of a particular operating system and having a forced hierarchical representation based on the rules of the particular operating system and the user-defined delimiter to be used to provide the desired level of hierarchy for the user, the desired level of hierarchy being different from the forced hierarchical representation, and the user-defined delimiter being placed in a particular user selected location in the object to indicate the desired level of hierarchy for data sets, the data sets being separate from the object and one or more data sets of the data sets to be presented in a manner based on the object, including the user-defined delimiter;

obtaining, by the processor, a set of rules associated with the object to be used to present data sets, the set of rules specific to the user-defined delimiter;

employing, by the processor, the object and the set of rules to determine one or more data sets to be presented to the user; and presenting, by the processor, the one or more data sets, wherein the presenting is based on the object, including placement of the user-defined delimiter in the object, and the set of rules, and wherein the presenting presents the one or more data sets in a hierarchy defined by at least the object.

18. The method of claim 17, wherein the hierarchy is defined by placement of the user-defined delimiter in the object.

19. The method of claim 17, wherein there is another object comprising the user-defined delimiter, and wherein the user-defined delimiter is placed in the object at one location to define a first hierarchy and placed in the another object in another location to define a second hierarchy.

20. The method of claim 17, wherein existence of <given string of characters>.user-defined delimiter indicates that data sets with <given string of characters>/<any match> are considered descendants of the user-defined delimiter.

* * * * *